C. J. THIM.
BEET TOPPER AND HOE COMBINED.
APPLICATION FILED SEPT. 30, 1919.
1,361,201.
Patented Dec. 7, 1920.
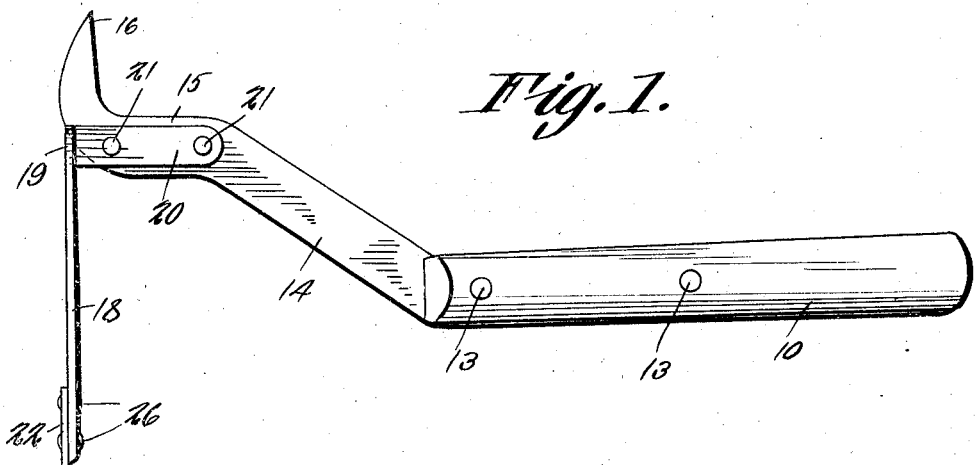
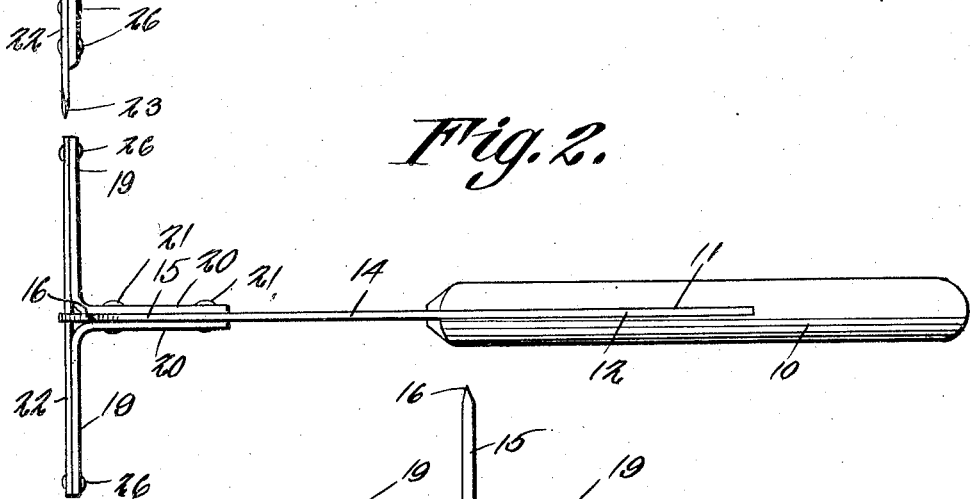
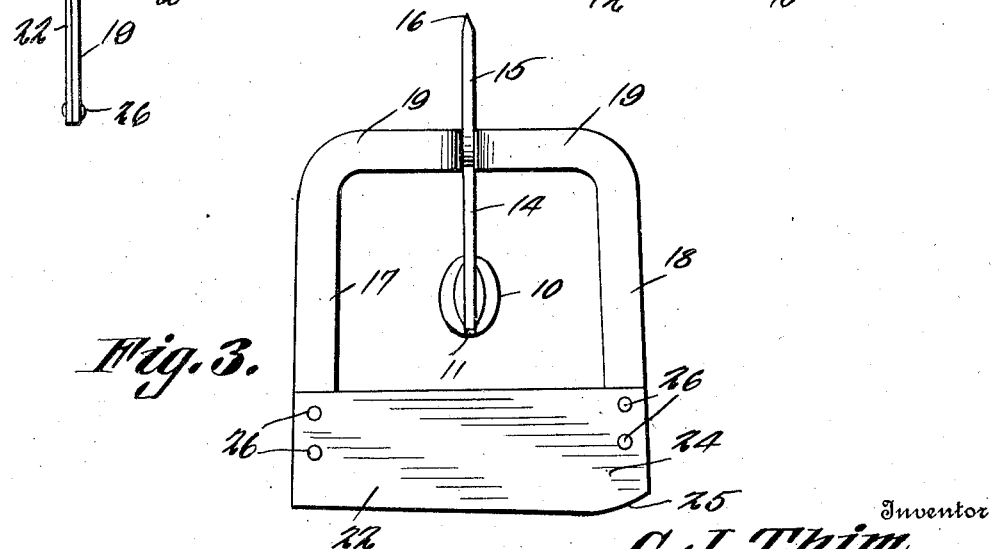
Witness
F. B. Wooden.
Inventor
C. J. Thim
By C. A. Snow & Co.
Attorneys

UNITED STATES PATENT OFFICE.

CARL J. THIM, OF LOGAN, UTAH.

BEET-TOPPER AND HOE COMBINED.

1,361,201.  Specification of Letters Patent.  Patented Dec. 7, 1920.

Application filed September 30, 1919. Serial No. 327,387.

*To all whom it may concern:*

Be it known that I, CARL J. THIM, a citizen of the United States, residing at Logan, in the county of Cache and State of Utah, have invented a new and useful Beet-Topper and Hoe Combined, of which the following is a specification.

This invention relates to new and useful improvements in farming implements, and more particularly to an implement especially designed for the cultivating and harvesting of beets.

It is the primary object of the present invention to provide a device of this character having means whereby an operator may top the beets, while the same are in their growing position in the ground, preparatory to the harvesting thereof.

A further object of the invention is to provide a device of this character which may be efficiently employed in the handling of beets, for moving the same from one place to another in the harvesting of the same.

A still further object of the invention is to provide a combined beet topper and hoe, which may be efficiently employed for hoeing vegetables or the like, the same being designed, to be operated with a minimum amount of exertion.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

Referring to the drawings:—

Figure 1 illustrates a side elevational view of a device constructed in accordance with the present invention.

Fig. 2 illustrates a plan view of the same, and

Fig. 3 illustrates a front elevational view.

Referring to the drawing in detail the reference character 10 designates the handle of the implement, which is relatively short, when the device is to be employed as a hand implement for topping beets, but when the implement is to be employed as a hoe, it would of course be preferable to extend the handle to the desired length to enable the same to be employed by a person, while in a standing position.

As shown, the handle 10 is provided with a central longitudinal slotted portion 11, extending from one end thereof and terminating a proper distance from the end, which slot is adapted to receive the shank 12 of the tool, the shank being secured between the sides of the slotted portion 11 by means of the transversely extending bolts 13, passing through suitable registering openings in the handle 10 and shank 12.

Formed integrally with the shank 12 and extending at an angle with relation thereto, in order that the blade to be hereinafter more fully described will be supported in proper operating relation with the handle, is the arm 14, which has an integral portion 15, extending at an angle with relation thereto, the extreme end of the portion 15 extending at right angles, and terminating in the pointed extremity 16, which pointed extremity 16 provides efficient means for spearing beets during the harvesting thereof, in moving the beets from the field to a conveyer, where the same are conveyed to the mill or store house.

The blade, forming an important feature of the invention includes the side bars 17 and 18, each of which comprises an upper curved portion 19 and a right angled portion 20 the right angled portions 20, of the side bars 17 and 18, being disposed in parallel relation with each other to grasp the end portion 15 of the shank 12, whereby the blade is rigidly secured to the shank; the bolts 21 however, pass through registering openings in the right angled portions 20 and portion 15, whereby movement of the bars 17 and 18, with relation to the shank 12, is absolutely prevented.

The blade proper, includes a relatively wide member 22 which has one of its edges beveled as at 23, to provide a cutting surface, when the device is to be employed for topping beets. The upper edge of the blade 22 as shown, is spaced from the lower edges of the curved portions 19, to provide a clearance, for earth when the implement is employed as a hoe, the clearance allowing the soil and clods to pass therethrough, thereby lessening the resistance of the hoe, and at the same time permitting the hoe to accomplish the chopping or hoeing result.

The blade 22, tapers toward one of the ends thereof, the wider portion 24 of the blade being curved as at 25, so that the blade 22 will have a shearing action, in severing the beet tops from the beets proper.

To insure the blade against displacement from the side bars 17 and 18, the rivets 26 pass through suitable openings in the blade 22 and side bars 17 and 18.

Having thus described the invention what is claimed is:—

In a farming implement, a handle, a blade support including a shank having connection with the handle, a blade comprising side bars having curved portions, the curved portions terminating in right angled portions, means for securing the right angled portions to opposite sides of the shank, and a blade connecting the side bars adjacent to the free ends thereof, said blade having an inclined cutting edge terminating in a curved portion to insure a shearing action.

In testimony that I claim the foregoing as my own, I have hereto affixed my signature in the presence of two witnesses.

CARL J. THIM.

Witnesses:
J. A. CROCKETT,
L. H. DAVIES.